(12) United States Patent
Ushigami et al.

(10) Patent No.: US 12,359,275 B2
(45) Date of Patent: Jul. 15, 2025

(54) METHOD FOR MANUFACTURING GRAIN-ORIENTED ELECTRICAL STEEL SHEET

(71) Applicant: NIPPON STEEL CORPORATION, Tokyo (JP)

(72) Inventors: Yoshiyuki Ushigami, Tokyo (JP); Shuichi Nakamura, Tokyo (JP); Hiroyasu Fujii, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 881 days.

(21) Appl. No.: 17/422,618

(22) PCT Filed: Jan. 16, 2020

(86) PCT No.: PCT/JP2020/001139
§ 371 (c)(1),
(2) Date: Jul. 13, 2021

(87) PCT Pub. No.: WO2020/149320
PCT Pub. Date: Jul. 23, 2020

(65) Prior Publication Data
US 2021/0388459 A1  Dec. 16, 2021

(30) Foreign Application Priority Data
Jan. 16, 2019 (JP) .................. 2019-005128

(51) Int. Cl.
*C21D 9/46* (2006.01)
*C21D 3/04* (2006.01)
(Continued)

(52) U.S. Cl.
CPC ............. *C21D 9/46* (2013.01); *C21D 3/04* (2013.01); *C21D 6/002* (2013.01); *C21D 6/005* (2013.01);
(Continued)

(58) Field of Classification Search
CPC ...... C21D 9/46; C21D 8/1222; C21D 8/1233; C21D 8/1261; C21D 8/1272; C23C 8/02; C23C 8/26; C23C 8/80; H01F 1/14766
See application file for complete search history.

(56) References Cited

U.S. PATENT DOCUMENTS

| | | |
|---|---|---|
| 3,785,882 A | 1/1974 | Jackson |
| 4,750,949 A | 6/1988 | Kobayashi et al. |
| 2002/0038678 A1 | 4/2002 | Ushigami et al. |

FOREIGN PATENT DOCUMENTS

| | | |
|---|---|---|
| EP | 0 987 343 A1 | 3/2000 |
| EP | 1 464 712 A1 | 10/2004 |

(Continued)

OTHER PUBLICATIONS

Ushigami Yoshiyuki, et.al. [JP2002332523A] [Machine Translation] (Year: 2002).*

(Continued)

*Primary Examiner* — Brian D Walck
*Assistant Examiner* — Nazmun Nahar Shams
(74) *Attorney, Agent, or Firm* — Birch, Stewart, Kolasch & Birch, LLP

(57) ABSTRACT

A method for manufacturing a grain-oriented electrical steel sheet includes: a silicon steel material production process of producing a silicon steel material; a hot rolling process of obtaining a hot rolled sheet by subjecting the silicon steel material to hot rolling; a cold rolling process of obtaining a steel sheet having a final sheet thickness by subjecting the hot rolled sheet to a single cold rolling process or to multiple cold rolling processes having intermediate annealing performed between cold rolling processes; a decarburization annealing process of subjecting the steel sheet to decarburization annealing using a decarburization annealing furnace including a heating area and a soaking area; and a final annealing process of applying an annealing separator having (Continued)

alumina as a main component to the steel sheet and subjecting the steel sheet to final annealing, wherein, in the decarburization annealing process, when X represents the Cr content of the silicon steel material in terms of mass %, an oxidation degree P1 of an atmosphere gas in the heating area satisfies the following Expression 1 and an oxidation degree P2 of an atmosphere gas in the soaking area satisfies the following Expression 2:

$0.18X - 0.008 \leq P1 \leq 0.25X + 0.15 \leq 0.20$ (Expression 1); and $0.01 \leq P2 \leq 0.15$ (Expression 2).

11 Claims, 2 Drawing Sheets

(51) Int. Cl.
| | |
|---|---|
| C21D 6/00 | (2006.01) |
| C21D 8/00 | (2006.01) |
| C21D 8/12 | (2006.01) |
| C22C 38/00 | (2006.01) |
| C22C 38/04 | (2006.01) |
| C22C 38/06 | (2006.01) |
| C22C 38/20 | (2006.01) |
| C22C 38/22 | (2006.01) |
| C22C 38/24 | (2006.01) |
| C22C 38/26 | (2006.01) |
| C22C 38/28 | (2006.01) |
| C22C 38/32 | (2006.01) |
| C22C 38/34 | (2006.01) |
| C23C 8/02 | (2006.01) |
| C23C 8/26 | (2006.01) |
| C23C 8/80 | (2006.01) |
| H01F 1/147 | (2006.01) |

(52) U.S. Cl.
CPC ............ C21D 6/008 (2013.01); C21D 8/005 (2013.01); C21D 8/1222 (2013.01); C21D 8/1233 (2013.01); C21D 8/1272 (2013.01); C22C 38/001 (2013.01); C22C 38/002 (2013.01); C22C 38/04 (2013.01); C22C 38/06 (2013.01); C22C 38/20 (2013.01); C22C 38/22 (2013.01); C22C 38/24 (2013.01); C22C 38/26 (2013.01); C22C 38/28 (2013.01); C22C 38/32 (2013.01); C22C 38/34 (2013.01); C23C 8/02 (2013.01); C23C 8/26 (2013.01); C23C 8/80 (2013.01); H01F 1/14766 (2013.01)

(56) References Cited

FOREIGN PATENT DOCUMENTS

| | | | |
|---|---|---|---|
| JP | 58-26405 | B2 | 6/1983 |
| JP | 62-86175 | A | 4/1987 |
| JP | 64-83620 | A | 3/1989 |
| JP | 7-118750 | A | 5/1995 |
| JP | 11-241120 | A | 9/1999 |
| JP | 2000-355717 | A | 12/2000 |
| JP | 2002-212637 | A | 7/2002 |
| JP | 2003-041320 | A | 2/2003 |
| JP | 2003-268451 | A | 9/2003 |
| JP | 2005-290446 | A | 10/2005 |
| JP | 4331886 | B2 | 9/2009 |

OTHER PUBLICATIONS

Toda Hiroki et.al. [JP2000355717A] [Machine Translation] (Year: 2000).*

Ushigami Yoshiyuki, et.al. [JP2002060843] [Machine Translation] (Year: 2002).*

Ushigami Yoshiyuki, et.al. [JP2002332523A] [Machine Translation] (Year: 2002) (Year: 2002).*

Toda Hiroki et.al. [JP2000355717A] [Machine Translation] (Year: 2000) (Year: 2000).*

Ushigami Yoshiyuki, et.al. [JP2002060843] [Machine Translation] (Year: 2002) (Year: 2002).*

* cited by examiner

METHOD FOR MANUFACTURING GRAIN-ORIENTED ELECTRICAL STEEL SHEET

TECHNICAL FIELD

The present invention relates to a method for manufacturing a grain-oriented electrical steel sheet.

Priority is claimed on Japanese Patent Application No. 2019-005128, filed Jan. 16, 2019, the content of which is incorporated herein by reference.

BACKGROUND ART

Grain-oriented electrical steel sheets are soft magnetic materials and are mainly used as iron core materials for transformers. For this reason, grain-oriented electrical steel sheets are required to have magnetic properties such as high magnetization characteristics and a low iron loss. Magnetization characteristics include magnetic flux densities induced when an iron core is excited. When magnetic flux densities increase, sizes of iron cores can be reduced, which is advantageous in terms of device constitutions of transformers and also in terms of the manufacturing costs of transformers.

In order to improve magnetization characteristics, it is necessary to control a texture to the crystal orientation (Goss orientation) in which the {110} plane is aligned parallel to the steel sheet surface and the <100> axis is aligned with the rolling direction. In order to accumulate crystal orientations in the Goss orientation, in general, the inhibitors such as AlN, MnS, and MnSe are finely precipitated in steel, and thereby, the secondary recrystallization is controlled.

Also, as magnetic properties, a high magnetic flux density (represented by a magnetic flux density B8 value when a magnetic field of 800 A/m is applied) and a low iron loss (represented by an energy loss $W_{17/50}$ (W/kg) with a magnetic flux density of 1.7 teslas (T) at a frequency of 50 hertz (Hz)) are required.

Iron loss is an electric power loss consumed as heat energy when iron cores are excited by an alternating-current magnetic fields. In view of energy saving, iron loss is required to be as low as possible. A level of iron loss is influenced by the magnetic susceptibility, sheet thickness, film tension, amount of impurities, electrical resistivity, grain size, magnetic domain size, and the like. Now that various technologies for electrical steel sheets have been developed, research and development to reduce iron loss are continuously performed to improve energy efficiency.

Patent Document 1 (Japanese Examined Patent Application, Second Publication No. S58-26405) discloses a method for reducing iron loss by irradiating a steel sheet which has been subjected to final annealing with a laser beam to provide local minute strain to the steel sheet so that a magnetic domain is subdivided, when an electrical steel sheet is used as a laminated iron core.

Also, Patent Document 2 (Japanese Unexamined Patent Application, First Publication No. S62-86175) discloses a method in which the magnetic domain refinement effect does not disappear even if an electrical steel sheet has been subjected to processing to iron core and then subjected to stress relief annealing (Stress Release Annealing) when an electrical steel sheet is used as a wound iron core. When a magnetic domain is subdivided using these technical means, iron loss is significantly reduced.

However, when the inventors of the present invention observed the movement of the magnetic domain when the magnetic domain was subdivided as described above, it was found that there were some magnetic domains which did not move. Thus, the inventors of the present invention have come to the recognition that, in order to further reduce an iron loss value of a grain-oriented electrical steel sheet, eliminating the pinning effect which hinders the movement of the magnetic domain caused by a glass film on a surface of the steel sheet is important as well as subdividing the magnetic domain.

In order to facilitate the movement of the magnetic domain as described above, it is effective not to form a glass film on the surface of a steel sheet. As a means for this, Patent Document 3 (Specification of U.S. Pat. No. 3,785,882) discloses a method for preventing a glass film from being formed on a surface of a steel sheet using coarse high-purity alumina as an annealing separator. However, this method cannot eliminate inclusions directly below a surface and a margin of improvement in iron loss is only 2% at most at $W_{15/60}$.

Patent Document 4 (Japanese Unexamined Patent Application, First Publication No. S64-83620) discloses a method for performing chemical polishing or electrolytic polishing after final annealing as a method for controlling inclusions directly below a surface and achieving mirror finishing of the surface. However, although it is possible to process a sample material at a laboratory level using a method such as chemical polishing and electrolytic polishing, in order to carry out the above method on an industrial scale, the problems concerning managing of a concentration and a temperature of a chemical solution and installing of a pollution control facility or the like need to be resolved. Furthermore, in view of productivity, it is very difficult to put the above method into practical use.

As a method for resolving this problem, Patent Document 5 (Japanese Unexamined Patent Application, First Publication No. H07-118750) discloses a method in which decarburization annealing is performed in an atmosphere gas having an oxidation degree at which Fe-based oxides ($Fe_2SiO_4$, FeO, and the like) are not formed and alumina is used as an annealing separator between sheets. However, even if this process were to be carried out industrially, it can be seen that it would be difficult to obtain good magnetic properties while decarburization is stably performed.

PRIOR ART DOCUMENT

Patent Document

[Patent Document 1]
  Japanese Examined Patent Application, Second Publication No. S58-026405
[Patent Document 2]
  Japanese Unexamined Patent Application, First Publication No. S62-86175
[Patent Document 3]
  Specification of U.S. Pat. No. 3,785,882
[Patent Document 4]
  Japanese Unexamined Patent Application, First Publication No. S64-083620
[Patent Document 5]
  Japanese Unexamined Patent Application, First Publication No. H07-118750

SUMMARY OF THE INVENTION

Problems to be Solved by the Invention

The present invention was made in view of the above-described problems and an object of the prevent invention is to provide a method for manufacturing a grain-oriented electrical steel sheet having good magnetic properties while satisfactorily performing decarburization in decarburization annealing.

Means for Solving the Problem (1) A method for manufacturing a grain-oriented electrical steel sheet according to an aspect of the present invention includes: a silicon steel material production process of producing a silicon steel material; a hot rolling process of obtaining a hot rolled sheet by subjecting the silicon steel material to hot rolling; a cold rolling process of obtaining a steel sheet having a final sheet thickness by subjecting the hot rolled sheet to a single cold rolling process or to multiple cold rolling processes having intermediate annealing performed between cold rolling processes; a decarburization annealing process of subjecting the steel sheet to decarburization annealing using a decarburization annealing furnace including a heating area and a soaking area; and a final annealing process of applying an annealing separator having alumina as a main component to the steel sheet and subjecting the steel sheet to final annealing, wherein the silicon steel material contains, in terms of mass %, Si: 0.8 to 7.0%; C: 0.085% or less; acid-soluble Al: 0.010 to 0.065%; N: 0.004 to 0.012%; Mn: 1.00% or less; S: 0.050% or less; Cr: 0.02 to 0.50%; and the remainder: Fe and impurities, and in the decarburization annealing process, and when X represents the Cr content of the silicon steel material in terms of mass %, an oxidation degree P1 of an atmosphere gas in the heating area satisfies the following Expression 1 and an oxidation degree P2 of an atmosphere gas in the soaking area satisfies the following Expression 2.

$0.18X-0.008 \leq P1 \leq 0.25X+0.15 \leq 0.20$ (Expression 1); and $0.01 \leq P2 \leq 0.15$ (Expression 2).

(2) In the method for manufacturing a grain-oriented electrical steel sheet according to (1), the P1 may satisfy the following Expression 3:

$0.3X+0.025 \leq P1 \leq 0.25X+0.15 \leq 0.20$ (Expression 3).

(3) In the method for manufacturing a grain-oriented electrical steel sheet according to (1) or (2), the P1 and the P2 may satisfy the following Expression 4:

$P1 > P2$ (Expression 4).

(4) In the method for manufacturing a grain-oriented electrical steel sheet according to any one of (1) to (3), the silicon steel material may further contain, in terms of mass %, Cu: 0% or more and 0.4% or less; P: 0% or more and 0.5% or less; Ni: 0% or more and 1.0% or less; B: 0% or more and 0.008% or less; V: 0% or more and 0.15% or less; Nb: 0% or more and 0.20% or less; Mo: 0% or more and 0.10% or less; Ti: 0% or more and 0.015% or less; and Bi: 0% or more and 0.010% or less.

(5) In the method for manufacturing a grain-oriented electrical steel sheet according to any one of (1) to (4), the method for manufacturing a grain-oriented electrical steel sheet may further include: a nitriding treatment process being performed from before the decarburization annealing process to before secondary recrystallization initiation in the final annealing process.

(6) In the method for manufacturing a grain-oriented electrical steel sheet according to any one of (1) to (5), the method for manufacturing a grain-oriented electrical steel sheet may further include: a hot-band annealing process of subjecting the hot rolled sheet obtained in the hot rolling process to annealing after the hot rolling process and before the cold rolling process.

Effects of the Invention

According to the above aspect of the present invention, it is possible to provide a method for manufacturing a grain-oriented electrical steel sheet having good magnetic properties while satisfactorily performing decarburization in decarburization annealing.

EMBODIMENTS FOR IMPLEMENTING THE INVENTION

Figure 1:
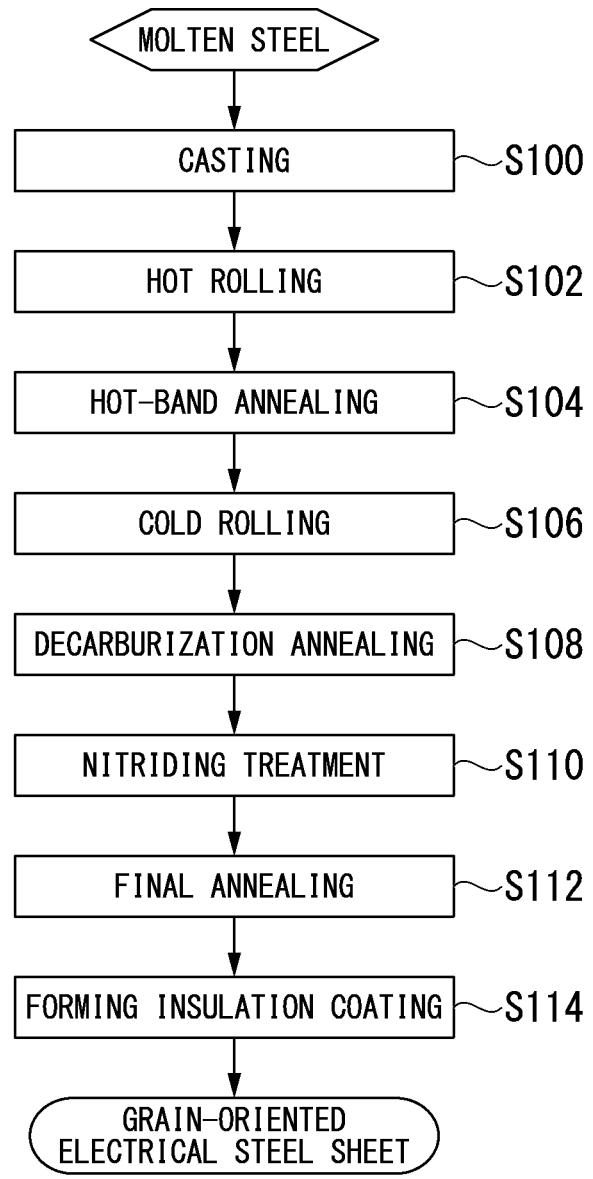
FIG. 1 is a flowchart for explaining a method for manufacturing a grain-oriented electrical steel sheet according to an embodiment of the present invention.

Although the above-described research has been conducted to improve magnetic properties of grain-oriented electrical steel sheets in the related art, there are still issues such as those mentioned above which need to be resolved. The inventors of the present invention have conducted various experiments to resolve such problems. As a result, the inventor found that, when an appropriate amount of Cr is included as a steel component and the oxidation degrees ($P_{H_2O}/P_{H_2}$) of atmosphere gas in a heating area and a soaking area of a decarburization annealing process are controlled, it is possible to manufacture a grain-oriented electrical steel sheet having good magnetic properties while satisfactorily performing decarburization.

Preferred embodiments of the present invention will be described below. Here, it is obvious that the present invention is not limited to the constitutions disclosed in these embodiments and various modifications are possible without departing from the gist of the present invention.

It is also obvious that the independent elements of the following embodiments can be combined with each other within the scope of the present invention.

Also, in the following embodiments, a numerically limited range includes a lower limit value and an upper limit value. However, numerical values indicated using the term "exceeding" and the expression "less than" are not included in this numerical range.

In addition, unless otherwise specified, "%" of a chemical composition in the following embodiments means "mass %".

A method for manufacturing a grain-oriented electrical steel sheet according to an embodiment of the present invention will be described below.

A method for manufacturing a grain-oriented electrical steel sheet according to the following embodiments includes: a silicon steel material production process of producing a silicon steel material; a hot rolling process of obtaining a hot rolled sheet by subjecting the silicon steel material to hot rolling; a cold rolling process of obtaining a steel sheet having a final sheet thickness by subjecting the hot rolled sheet to a single cold rolling process or to multiple cold rolling processes having intermediate annealing performed between cold rolling processes; a decarburization annealing process of subjecting the steel sheet to decarburization annealing using a decarburization annealing furnace including a heating area and a soaking area; and a final annealing process of applying an annealing separator having alumina as a main component to the steel sheet and subjecting the steel sheet to final annealing, in which the silicon steel material contains, in terms of mass %, Si: 0.8 to 7.0%; C: 0.085% or less; acid-soluble Al: 0.010 to 0.065%; N: 0.004 to 0.012%; Mn: 1.00% or less; S: 0.050% or less; Cr: 0.02 to 0.50%; and the remainder: Fe and impurities, and in which, in the decarburization annealing process, when X represents the Cr content of the silicon steel material in terms of mass %, an oxidation degree P1 of an atmosphere gas in the heating area satisfies the following Expression 1 and an oxidation degree P2 of an atmosphere gas in the soaking area satisfies the following Expression 2. Furthermore, in the method for manufacturing a grain-oriented electrical steel sheet according to the above-described embodiment, a hot-band annealing process of subjecting the hot rolled sheet which has been obtained in the hot rolling process to annealing may be further provided after the hot rolling process and before the cold rolling process:

$$0.18X-0.008 \leq P1 \leq 0.25X+0.15 \leq 0.20 \quad \text{(Expression 1); and}$$

$$0.01 \leq P2 \leq 0.15 \quad \text{(Expression 2).}$$

[Chemical Components of Silicon Steel Material]

If the Si content increases, the electrical resistance increases and iron loss characteristics are improved. However, if the Si content exceeds 7.0%, cold rolling is extremely difficult and a steel material may crack during rolling. For this reason, an upper limit of the Si content is 7.0%. The upper limit of the Si content is preferably 4.5%, and more preferably 4.0%.

Also, if the Si content is less than 0.8%, γ transformation occurs during final annealing and a crystal orientation of a steel sheet is impaired. For this reason, a lower limit of the Si content is 0.8%. The lower limit of the Si content is preferably 2.0%, and more preferably 2.5%.

C is an element which is effective in controlling a primary recrystallization structure, which adversely affects magnetic properties. Thus, C needs to be removed by performing a decarburization process before final annealing.

If the C content of the silicon steel material is more than 0.085%, a decarburization annealing time increases and the productivity in industrial production is impaired. For this reason, an upper limit of the C content is 0.085%. The upper limit of the C content is preferably 0.070%.

In the method for manufacturing a grain-oriented electrical steel sheet according to this embodiment, acid-soluble Al is an essential element for binding with N and functioning as an inhibitor as (Al, Si)N. The acid-soluble Al content is 0.010 to 0.065% in which secondary recrystallization is stable.

A lower limit of the acid-soluble Al content is preferably 0.020%, and more preferably 0.025%. An upper limit of the acid-soluble Al content is preferably 0.040%, and more preferably 0.030%.

If the N content exceeds 0.012%, voids called blisters occur in a steel sheet during cold rolling. Thus, it is desirable that the N content do not exceed 0.012%. Furthermore, in order to bind with Al and function as an inhibitor, the N content needs to be 0.004% or more. A lower limit of the N content is preferably 0.006%, and more preferably 0.007%. An upper limit of the N content is preferably 0.010%, and more preferably 0.009%.

It is desirable that Mn and S be contained within a range such that Mn/S≥4 is satisfied in view of preventing the occurrence of cracks in hot rolling. On the other hand, if the Mn content increases, a saturation magnetic flux decreases. Thus, the Mn content is preferably 1.00% or less. The S content is preferably 0.050% or less, more preferably 0.015% or less, still more preferably 0.010% or less, and still more preferably 0.007% or less.

Also, a part of S can be partially replaced with Se. For this reason, when Se is included, S+Se: 0.050% or less is preferable and it is desirable that a range be set to satisfy Mn/(S+Se)≥4.

Mn and S may be utilized as inhibitors for secondary recrystallization in some cases. In this cases, the Mn content at which stable secondary recrystallization is provided is within the range of 0.02 to 0.30%. A lower limit of the Mn content is preferably 0.05%, and more preferably 0.07%. An upper limit of the Mn content is preferably 0.15%, and more preferably 0.10%. Furthermore, in this case, the preferred S content is within the range of 0.010 to 0.050%. The S content is preferably 0.015% or more, and more preferably 0.020% or more. The S content is more preferably 0.040% or less. In addition, S can also be replaced with Se.

In the manufacturing method of Taguchi, Sakakura, et al. (for example, Japanese Examined Patent Application, Second Publication No. S40-15644), Mn and S are utilized as inhibitors for secondary recrystallization.

On the other hand, in the manufacturing method of Komatsu et al. (for example, Japanese Examined Patent Application, Second Publication No. S62-45285), Mn and S are not utilized as inhibitors for secondary recrystallization.

Cr is an element which has an influence on an oxide layer formation behavior in decarburization annealing, improves decarburization properties, and promotes subsequent surface smoothing.

The Cr content is 0.02 to 0.50% in which the effect of improving decarburization properties is obtained. A lower limit of the Cr content is preferably 0.05% and an upper limit of the Cr content is preferably 0.39%.

In this embodiment, as components for the silicon steel material, in addition to the above components, if necessary, one or two or more elements selected from the group consisting of Cu, Ni, P, Mo, Bi, B, V, Nb, and Ti, in terms of mass %, Cu: 0 to 0.4%; Ni: 0 to 1.0%; P: 0 to 0.5%; Mo: 0 to 0.10%; Bi: 0 to 0.010%; B: 0 to 0.008%; V: 0 to 0.15%; Nb: 0 to 0.20%; and Ti: 0 to 0.015% may also be contained.

Cu: 0% or More and 0.4% or Less

Copper (Cu) is an element which is effective in increasing electric resistance and reducing iron loss. Therefore, Cu may be contained within the range of the content of 0.4% or less. If the Cu content exceeds 0.4%, the effect of reducing iron loss is saturated and it may cause a surface defect called a "copper scab" during hot rolling in some cases. A lower limit of the Cu content is preferably 0.05%, and more preferably 0.1%. An upper limit of the Cu content is preferably 0.3%, and more preferably 0.2%.

Ni: 0% or More and 1.0% or Less

Nickel (Ni) is an element which is effective in increasing electric resistance and reducing iron loss. Furthermore, Ni is an effective element for controlling a metallographic structure of a hot rolled sheet and improving magnetic properties. Therefore, Ni may be contained within the range of the content of 1.0% or less. If the Ni content exceeds 1.0%, secondary recrystallization may be unstable in some cases. A lower limit of the Ni content is preferably 0.01%, and more preferably 0.02%. An upper limit of the Ni content is preferably 0.2%, and more preferably 0.1%.

P: 0% or More and 0.5% or Less

Phosphorus (P) is an element which is effective in increasing electric resistance and reducing iron less. Therefore, P may be contained within the range of the content of 0.5% or less. If the P content exceeds 0.5%, there may be a problem in the rollability of a silicon steel sheet in some cases. A lower limit of the P content is preferably 0.005%, and more preferably 0.01%. An upper limit of the P content is preferably 0.2%, and more preferably 0.15%.

Mo: 0% or More and 0.10% or Less

Molybdenum (Mo) is also an effective element for increasing electric resistance and reducing iron loss. Therefore, Mo may be contained within the range of 0.10% or less. If the Mo content exceeds 010%, a problem may occur in the rollability of the steel sheet in some cases. A lower limit of the Mo content is preferably 0.005%, and more preferably 0.01%. An upper limit of the Mo content is preferably 0.08%, and more preferably 0.05%.

Bi: 0% or More and 0.010% or Less

Bismuth (Bi) is an element which is effective for stabilizing precipitates such as sulfide and strengthening a function as an inhibitor. Therefore, Bi may be contained within the range of 0.010% or less. If the Bi content exceeds 0.010%, the magnetic properties may deteriorate in some cases. A lower limit of the Bi content is preferably 0.001%, and more preferably 0.002%. An upper limit of the Bi content is preferably 0.008%, and more preferably 0.006%.

B: 0% or More and 0.008% or Less

Boron (B) is an element which is effective for exerting an inhibitor effect as BN. Therefore, B may be contained within the range of 0.008% or less. If the B content exceeds 0.008%, there is a concern concerning deterioration of magnetic properties. A lower limit of the B content is preferably 0.0005%, and more preferably 0.001%. An upper limit of the B content is preferably 0.005%, and more preferably 0.003%.

V: 0% or More and 0.15% or Less
Nb: 0% or More and 0.20% or Less
Ti: 0% or More and 0.015% or Less Vanadium (V), niobium (Nb), and titanium (Ti) are effective elements which binds with N or C and act as inhibitors. Therefore, V, Nb, and Ti may be contained within the ranges of 0.15% or less, 0.2% or less, and/or 0.015% or less, respectively. If these elements remain in a final product and the V content exceeds 0.15%, the Nb content exceeds 0.20%, or the Ti content exceeds 0.015%, there is a concern concerning deterioration of magnetic properties.

A lower limit of the V content is preferably 0.002%, and more preferably 0.01%. An upper limit of the V content is preferably 0.10%, and more preferably 0.05%.

A lower limit of the Nb content is preferably 0.005%, and more preferably 0.02%. An upper limit of the Nb content is preferably 0.10%, and more preferably 0.08%.

A lower limit of the Ti content is preferably 0.002%, and more preferably 0.004%. An upper limit of the Ti content is preferably 0.010%, and more preferably 0.008%.

[Method for Manufacturing Grain-Oriented Electrical Steel Sheet]

In order to manufacture a grain-oriented electrical steel sheet having a texture developed in a {110} <001> orientation from the silicon steel material having the above-described chemical composition, the following steps are performed.

First, molten steel having the above-described chemical composition is cast (S100) to obtain a silicon steel material and a hot rolled sheet is obtained from this silicon steel material using a normal hot rolling step (S102). Alternatively, instead of the hot rolling step (S102), molten steel may be continuously cast to form a thin strip.

The hot rolled sheet or the continuously cast thin strip is subjected to the cold rolling step (S106) immediately or through the hot-band annealing step (S104).

The annealing in the hot-band annealing step (S104) may be performed within a temperature range of 750 to 1200° C. for 30 seconds to 30 minutes.

The hot-band annealing step is effective for enhancing the magnetic properties of a product. The presence or absence of the hot-band annealing step may be determined in accordance with the properties and the manufacturing costs required for the grain-oriented electrical steel sheet to be finally manufactured and the hot-band annealing step may be omitted.

The cold rolling in the cold rolling step (S106) is performed through single cold rolling process or multiple cold rolling processes having annealing performed between the cold rolling processes. When a single cold rolling process is performed, the rolling reduction is preferably 80% or more. Furthermore, when the multiple cold rolling processes having annealing performed between the cold rolling processes are performed, the rolling reduction of the final cold rolling after the last annealing is more preferably 80% or more. A cold rolled sheet obtained through this step is a steel sheet having a final sheet thickness.

The material which has been subjected to cold rolling undergoes the decarburization annealing step (S108) to remove carbon contained in the steel.

In the method for manufacturing a grain-oriented electrical steel sheet according to this embodiment, in the decarburization annealing step (S108), decarburization annealing is performed in a moist hydrogen atmosphere using the decarburization annealing furnace including the heating area and the soaking area. Annealing is performed by controlling an atmosphere gas in the decarburization annealing step (S108) to an oxidation degree at which iron (Fe)-based oxide is not formed.

An oxidation degree P1 of an atmosphere gas in the heating area in the decarburization annealing step (S108) is controlled to satisfy the following Expression 1:

$$0.18X - 0.008 \leq P1 \leq 0.25X + 0.15 \leq 0.20 \quad \text{(Expression 1)}$$

In Expression 1, X represents the Cr content (mass %) of a silicon steel material and P1 represents an oxidation degree of an atmosphere gas in the heating area in the decarburization annealing step (S108). The oxidation degree P1 is an oxidation degree represented by a ratio "$P_{H_2O}/P_{H_2}$" of a partial pressure of water vapor to a partial pressure of hydrogen in an atmosphere gas containing hydrogen, nitrogen, and water vapor.

When the oxidation degree P1 of the atmosphere gas in the heating area in the decarburization annealing step (S108) is defined using the foregoing Expression 1, it is considered that an initial oxide film which contains Cr oxide is formed in the outermost surface of the steel sheet in the heating area and decarburization is performed preferably. It is considered that the iron-based oxide film reacts with an annealing separator such as alumina applied in a subsequent step and inhibits surface smoothing. Although the decarburization properties are rate-determined by the initial oxide film formed on the surface first in the heating area, it is considered that when Cr is contained, Cr oxide causes to change the initial oxide film and then the decarburization properties is improved.

An oxidation degree P2 of an atmosphere gas in the soaking area in the decarburization annealing step (S108) is controlled to satisfy the following Expression 2:

$$0.01 \leq P2 \leq 0.15 \quad \text{(Expression 2)}$$

The oxidation degree P2 is an oxidation degree represented by a ratio "$P_{H2O}/P_{H2}$" of a partial pressure of water vapor to a partial pressure of hydrogen in an atmosphere gas containing hydrogen, nitrogen, and water vapor.

In order to smooth a surface of the steel sheet which has been subjected to a final annealing by applying an annealing separator containing alumina as a main component in a subsequent step and laminating a steel sheet, it is desirable to perform annealing at an oxidation degree at which Fe-based oxides ($Fe_2SiO_4$, FeO, and the like) are not formed in this decarburization annealing. For example, in a temperature range of 800 to 850° C. in which decarburization annealing is normally performed, it is possible to suppress the formation of Fe-based oxides by adjusting the oxidation degree P2 ($P_{H2O}/P_{H2}$) of the atmosphere gas in the soaking area to 0.15 or less.

When the oxidation degree P2 of the atmosphere gas in the soaking area is greater than 0.15, inclusions are generated below a surface of a product, which hinders the reduction of iron loss. Here, if the oxidation degree P2 decreases too much, a decarburization rate will decrease. When both of these are taken into account, in this temperature range, the oxidation degree P2 ($P_{H2O}/P_{H2}$) of the atmosphere gas in the soaking area is preferably within the range of 0.01 to 0.15.

In the decarburization annealing step, the oxidation degree P1 of the atmosphere gas in the heating area more preferably satisfies the following Expression 3:

$$0.3X+0.025 \leq P1 \leq 0.25X+0.15 \leq 0.20 \quad \text{(Expression 3)}$$

In Expression 3, X represents the Cr content (mass %) of a silicon steel material.

Also, in the decarburization annealing step, in view of that even better iron loss can be obtained, it is more desirable that the oxidation degree P1 of the atmosphere gas in the heating area and the oxidation degree P2 of the atmosphere gas in the soaking area satisfy the following Expression 4:

$$P1 > P2 \quad \text{(Expression 4)}$$

In the decarburization step, a heating rate from room temperature to a temperature of the soaking area (a heating rate in the heating area) is preferably 7° C./second or more on average, and more preferably 9° C./second or more. If the heating rate is too slow, the decarburization properties deteriorate. Furthermore, it is not necessary to specify an upper limit, but if the heating rate is too fast, it will be difficult to control a soaking temperature.

A temperature of the soaking area and a retention time in the soaking area are preferably 750 to 900° C. and 10 to 600 seconds. If a temperature (an annealing temperature) of the soaking area is less than 750° C., the decarburization rate decreases and the productivity decreases. On the other hand, if the temperature of the soaking area is greater than 900° C., a primary recrystallization grain size exceeds a desired size and thus the magnetic properties after the final annealing deteriorate. Furthermore, if the retention time is less than 10 seconds, decarburization cannot be sufficiently performed. On the other hand, if the retention time is greater than 600 seconds, the productivity decreases.

A nitriding treatment step (S110) may be provided from before the decarburization annealing step (S108) to the start of secondary recrystallization in the final annealing step (S112).

The method for this nitriding treatment is not particularly limited. There are a method to be performed in an atmosphere gas having a nitriding ability such as ammonia, a method in which a nitride having a nitriding ability is added to an annealing separator, and the like.

For example, it is desirable that, in the nitriding treatment step (S110), the nitriding treatment of a manufacturing method of Komatsu et al. in which (Al, Si)N is utilized as a main inhibitor (Japanese Examined Patent Application, Second Publication No. S62-45285 or the like) be used.

In the final annealing step (S112), an annealing separator containing alumina as a main component (containing 50 mass % or more of alumina) is applied to the steel sheet. The annealing separator preferably contains 5 to 50 mass % of magnesia in addition to alumina. If magnesia is contained, the formation of inclusions such as mullite ($3Al_2O_3 \cdot 2SiO_2$) on a surface of the steel sheet is suppressed and the iron loss is stably improved.

In the final annealing step, the above-described annealing separator containing alumina as a main component is applied to the surface of the steel sheet having an oxide layer and dried. In addition, after the above-described annealing separator is dried, the steel sheet is wound in a coil shape, and subjected to the final annealing (the secondary recrystallization annealing).

When an annealing separator containing alumina as a main component is utilized, it is possible to suppress the formation of a film of an inorganic mineral substance such as forsterite on the surface of the steel sheet even if the final annealing is performed.

With regard to the application of the annealing separator, when a decarburized annealed sheet is laminated (coiled), it is desirable to apply an annealing separator containing alumina as a main component which does not easily react with silica in the form of a water slurry, through an electrostatic coating method, or the like.

This laminated decarburized annealed sheet is subjected to the final annealing to occur secondary recrystallization and purification of nitride, sulfide, or the like. Performing the secondary recrystallization within a prescribed temperature range using a means such as holding the steel sheet at a constant temperature is effective in increasing a magnetic flux density.

Although the final annealing may be performed, for example, under the conditions that a temperature is raised to 1150 to 1250° C. and annealing is performed for 10 to 30 hours in an atmosphere gas containing hydrogen and nitrogen, when purification or the like of nitride, sulfide, or the like is performed, after the completion of the secondary recrystallization, it is desirable to perform annealing at a temperature of 1100° C. or higher in a 100% hydrogen atmosphere.

After the final annealing as described above, the surface of the steel sheet becomes a mirror shape and iron loss can be significantly reduced.

After the final annealing step (S112), in an insulation coating forming step (S114), an insulation coating configured to provide tension to the steel sheet is formed on the surface of the steel sheet.

Also, if necessary, magnetic domain refinement processing may be performed between the above-described steps through a mechanical method using a tooth profile or the like, a chemical method using etching or the like, laser irradiation, electron beam irradiation, or the like.

As described above, in the decarburization annealing step in which the decarburization annealing is performed in the moist hydrogen atmosphere to remove carbon contained in the steel which has been subjected to cold rolling, the annealing to be performed through the controlling of the atmosphere gas to have the oxidation degree in which the iron-based oxide is not formed is a main characteristic of the method for manufacturing a grain-oriented electrical steel sheet according to the embodiment of the present invention.

Also, in the method for manufacturing a grain-oriented electrical steel sheet according to the above-described embodiment, the nitriding treatment step may be further provided from before the decarburization annealing step to before the secondary recrystallization initiation in the final annealing (for example, at a prescribed temperature of a temperature range of 600 to 1000° C.). To be specific, the nitriding treatment step may be performed independently before the decarburization annealing step, carried out in one or more steps of a heating step, a soaking step, and a cooling step in the decarburization annealing step, carried out independently after a decarburization annealing step, or carried out before the secondary recrystallization initiation in the final annealing step by adding a nitrogen compound to an annealing separator.

The grain-oriented electrical steel sheet obtained through the manufacturing method in the above-described embodiment can be mainly used as an iron core of a transformer or other electric devices.

EXAMPLES

Although examples of the present invention will be described below, it is obvious that the conditions adopted in the examples are embodiments in which the feasibility and the effects of the present invention can be confirmed and the present invention is not limited to this embodiment.

The inventors of the present invention considered that the oxide layer formed at an initial stage of decarburization annealing has a significant influence on a subsequent decarburization behavior with respect to the decarburization behavior on the surface of the silicon steel sheet and conducted various experiments associated with this.

Example 1

A silicon steel slab containing, in terms of mass % obtained through casting, Si: 3.3%; Mn: 0.14%; C: 0.05%; S: 0.007%; acid-soluble Al: 0.027%; N: 0.008%; and the remainder: Fe and impurities was heated and then subjected to hot rolling to have a sheet thickness of 2.0 mm. The hot rolled sheet was subjected to annealing in which it was heated to 1100° C., cooled to 900° C., and was held for 30 seconds, and then subjected to one cold rolling to a final sheet thickness of 0.22 mm.

The cold rolled sheet was subjected to decarburization annealing in which an oxidation degree ($P_{H2O}/P_{H2}$) was changed by changing a dew point in an atmosphere gas including 75% hydrogen and 25% nitrogen and a temperature was raised to 830° C. at a heating rate of 7° C./second and held for 120 seconds. In Example 1, the oxidation degree in the heating area is equal to the oxidation degree in the soaking area.

After that, an amount of nitrogen in the steel was increased to 0.02 mass % in an ammonia gas (a nitriding treatment) and an inhibitor was strengthened.

The decarburized annealed sheet was subjected to the final annealing in which an annealing separator (80 mass % of alumina+20 mass % of magnesia) containing alumina as a main component was applied in the form of a water slurry, a temperature was raised to 1200° C. in an atmosphere gas containing 75% hydrogen and 25% nitrogen, the atmosphere gas was changed to a 100% hydrogen atmosphere gas, and then annealing was performed at 1200° C. for 20 hours.

The samples prepared through the above steps were washed with water and then were sheared, were subjected to stress relief annealing, had an insulation coating formed to provide tension to the steel sheet (had a tension coating to be applied), were subjected to laser irradiation, and were subjected to magnetic measurement through an SST method. Table 1 shows amounts of carbon after the decarburization annealing and the values of iron loss ($W_{17/50}$) obtained through the above magnetic measurement.

TABLE 1

| Sample No. | Oxidation degree of decarburization annealing | Amount of carbon of decarburized sheet (ppm) | Evaluation of amount of carbon | Iron loss ($W_{17/50}$) (W/kg) | Evaluation of iron loss | Comprehensive evaluation |
| --- | --- | --- | --- | --- | --- | --- |
| 1 | 0.01 | 66 | B | 0.63 | Ex | B |
| 2 | 0.04 | 57 | B | 0.64 | Ex | B |
| 3 | 0.06 | 45 | B | 0.66 | Ex | B |
| 4 | 0.11 | 38 | B | 0.67 | Ex | B |
| 5 | 0.15 | 31 | B | 0.67 | Ex | B |
| 6 | 0.20 | 19 | Ex | 0.74 | B | G |
| 7 | 0.25 | 7 | Ex | 0.81 | B | G |

In Table 1, "Ex" means an excellent result, "G" means a good range (allowable), and "B" means a bad result.

From Table 1, when annealing was performed in a wet gas (a water vapor-hydrogen-nitrogen mixed gas) atmosphere with an oxidation degree of 0.01 to 0.15, the surface of the steel sheet was smoothed and the amount of carbon was reduced to 0.02% or less. Thus, the crystal orientation was not impaired through transformation during final annealing and a good iron loss of 0.70 W/kg or less was obtained.

However, since the amount of carbons in the steel was greater than 0.0030% (30 ppm), there was a concern concerning magnetic aging (deterioration of magnetic properties due to aging).

Also, when annealing was performed in a wet gas atmosphere having an oxidation degree of 0.20 or more, the amount of carbon in the steel was 0.0030% or less, but good iron loss is not obtained.

It is considered that the reason why the amount of carbon was not reduced to 0.0030% or less depended on a quality and a morphology of an oxide formed on the surface of the steel sheet in a heating process of decarburization annealing. On the surface in decarburization annealing, generally, a decarburization (oxidation of carbon in the steel) reaction and an oxide formation (oxidation of silicon in the steel) reaction of a silica or the like was competing with the moisture in the atmosphere.

jected to magnetic measurement through an SST method. Table 2 shows amounts of carbon after the decarburization annealing and the values of iron loss ($W_{17/50}$) obtained through the above magnetic measurement.

TABLE 2

| Sample No. | Oxidation degree of decarburization annealing | Amount of carbon of decarburized sheet (ppm) | Evaluation of amount of carbon | Iron loss ($W_{17/50}$) (W/kg) | Evaluation of iron loss | Comprehensive evaluation |
|---|---|---|---|---|---|---|
| 1 | 0.01 | 29 | Ex | 0.63 | Ex | Ex |
| 2 | 0.04 | 15 | Ex | 0.64 | Ex | Ex |
| 3 | 0.06 | 13 | Ex | 0.64 | Ex | Ex |
| 4 | 0.11 | 4 | Ex | 0.63 | Ex | Ex |
| 5 | 0.15 | 2 | Ex | 0.64 | Ex | Ex |
| 6 | 0.20 | 2 | Ex | 0.75 | B | G |
| 7 | 0.25 | 2 | Ex | 0.79 | B | G |

From the results of Example 1, it is considered that, when annealing was performed in a low oxidation atmosphere gas which does not form iron-based oxides, silica on the surface of the steel sheet was generally generated in the form of a dense film, which inhibits decarburization.

Example 2

Furthermore, investigations were performed regarding other oxide forming elements and forming the Cr oxide on the surface of the steel sheet by containing an appropriate amount of Cr and promoting a decarburization reaction by suppressing a silica formation reaction were reviewed. The results will be described below as Example 2.

A silicon steel slab containing, in terms of mass % obtained through casting, Si: 3.3%; Mn: 0.14%; C: 0.05%; S: 0.007%; acid-soluble Al: 0.027%; N: 0.008%; Cr: 0.12%; and the remainder: Fe and impurities was heated and then subjected to hot rolling to have a sheet thickness of 2.0 mm. The hot rolled sheet was heated to 1100° C.,—cooled to 900° C., and was held for 30 seconds, and then subjected to one cold rolling to a final sheet thickness of 0.22 mm.

The cold rolled sheet was subjected to decarburization annealing in which an oxidation degree ($P_{H2O}/P_{H2}$) was changed by changing a dew point in an atmosphere gas including 75% hydrogen and 25% nitrogen and a temperature was raised to 830° C. at a heating rate of 7° C./second and held for 120 seconds. In Example 2, the oxidation degree in the heating area is equal to the oxidation degree in the soaking area.

After that, an amount of nitrogen in the steel was increased to 0.02 mass % in an ammonia gas (a nitriding treatment) and an inhibitor was strengthened.

The decarburized annealed sheet was subjected to the final annealing in which an annealing separator (50 mass % of alumina+50 mass % of magnesia) containing alumina as a main component was applied in the form of a water slurry, a temperature was raised to 1200° C. in an atmosphere gas containing 75% hydrogen and 25% nitrogen, the atmosphere gas was changed to a 100% hydrogen atmosphere gas, and then annealing was performed at 1200° C. for 20 hours.

The samples prepared through the above steps were washed with water and then were sheared, were subjected to stress relief annealing, had an insulation coating formed to provide tension to the steel sheet (had a tension coating to be applied), were subjected to laser irradiation, and were sub- In Table 2, "Ex" means an excellent result, "G" means a good range (allowable), and "B" means a bad result.

It can be seen from Table 2 that, when annealing was performed in a wet gas (a water vapor-hydrogen-nitrogen mixed gas) atmosphere with an oxidation degree of 0.01 to 0.15 by including an appropriate amount of Cr in the silicon steel material, good iron loss is obtained and the amount of carbon in the steel is 0.0030% (30 ppm) or less.

Example 3

In Example 2, it was presumed that the contained Cr formed an oxide in a heating process of decarburization annealing and suppressed silica formation which inhibits a decarburization reaction. Thus, a relationship between the oxidation degree ($P1=P_{H2O}/P_{H2}$) of the atmosphere gas in the heating area and the Cr content was reviewed.

A silicon steel slab containing, in terms of mass % obtained through casting, Si: 3.3%; Mn: 0.14%; C: 0.05%; S: 0.007%; acid-soluble Al: 0.027%; N: 0.008%; Cr: 0 to 0.62%; and the remainder: Fe and impurities was heated and then subjected to hot rolling to have a sheet thickness of 2.0 mm. The hot rolled sheet was heated to 1100° C., a temperature of the hot rolled sheet decreases to 900° C., and the hot rolled sheet was subjected to annealing in which it is held for 30 seconds, and then subjected to one cold rolling to a final sheet thickness of 0.22 mm.

The cold rolled sheet was subjected to decarburization annealing in which an oxidation degree ($P1=P_{H2O}/P_{H2}$) was changed by changing a dew point in the heating area in an atmosphere gas including 75% hydrogen and 25% nitrogen and a temperature was raised to 830° C. at a heating rate of 7° C./second and held at 830° C. for 120 seconds using 0.06 as an oxidation degree (P2) of the atmosphere gas.

After that, an amount of nitrogen in the steel was increased to 0.02 mass % in ammonia gas to strengthen the inhibitor.

The decarburized annealed sheet was subjected to the final annealing in which an annealing separator (70 mass % of alumina+30 mass % of magnesia) containing alumina as a main component was applied in the form of a water slurry, a temperature was raised to 1200° C. in an atmosphere gas containing 75% hydrogen and 25% nitrogen, the atmosphere gas was changed to a 100% hydrogen atmosphere gas, and then annealing was performed at 1200° C. for 20 hours.

The samples prepared through the above steps were washed with water and then were sheared, were subjected to stress relief annealing, had an insulation coating formed to provide tension to the steel sheet (had a tension coating to be applied), were subjected to laser irradiation, and were subjected to magnetic measurement using through an SST method.

Figure 2:
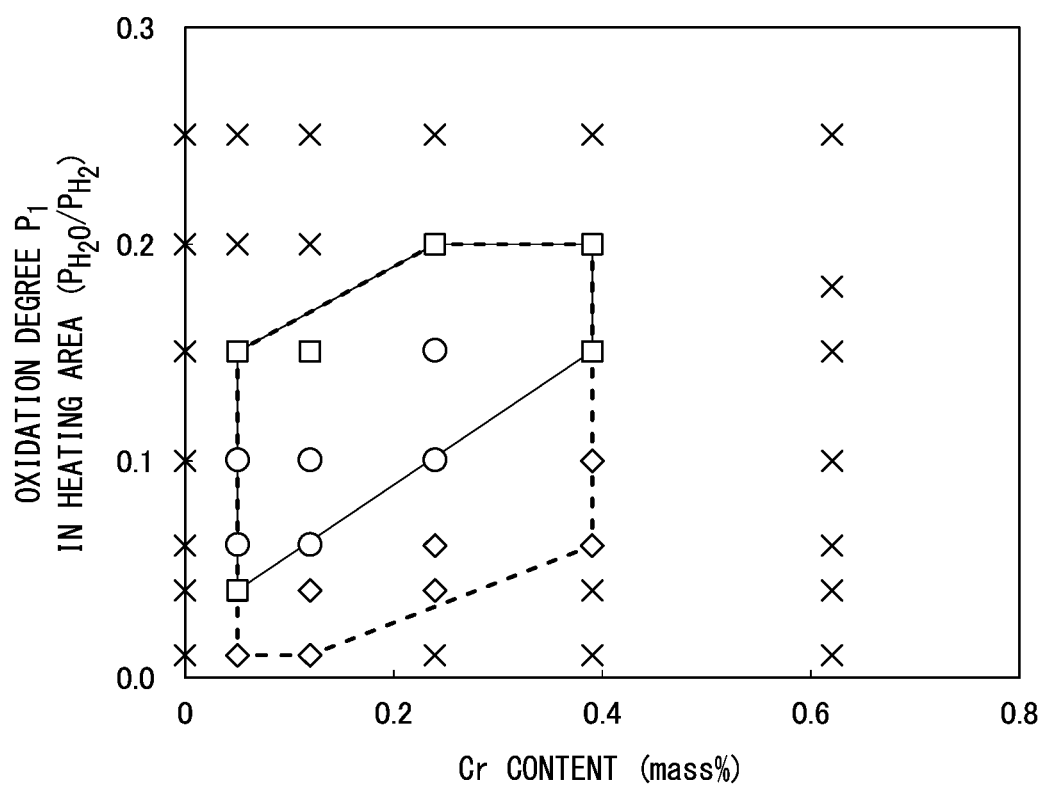
FIG. 2 is a graph showing a relationship between the Cr content X (mass %) and an oxidation degree P1 of an atmosphere gas in a heating area of decarburization annealing in Example 3.

A good range in which the amount of carbon after decarburization annealing is 0.0030% or less and the iron loss ($W_{17/50}$) is 0.70 (W/kg) or less is shown as a region surrounded by the dotted line in the graph of FIG. 2. FIG. 2 is a diagram illustrating a relationship between the Cr content X (mass %) and the oxidation degree P1 of the atmosphere gas in the heating area in decarburization annealing which affect—the amount of carbon after decarburization annealing and the iron loss of a product.

In FIG. 2, the plot of "o" is a good experimental example in which the amount of carbon is 0.0030% or less and the iron loss ($W_{17/50}$) is 0.65 (W/kg) or less, the plot of "□" is a good experimental example in which the amount of carbon is 0.0030% or less and the iron loss ($W_{17/50}$) is 0.67 (W/kg) or less, and the plot of "0" is a good experimental example in which the amount of carbon is 0.0030% or less and the iron loss ($W_{17/50}$) is 0.70 or less.

In FIG. 2, the plot of "x" is an experimental example in which the amount of carbon is greater than 0.0030% or the iron loss ($W_{17150}$) is greater than 0.70 (W/kg).

It can be seen from FIG. 2 that good characteristics with the amount of carbon after decarburization annealing of 0.0030% or less and the iron loss ($W_{17/50}$) of 0.70 (W/kg) or less are obtained within the range of the following Expression 1 according to the relationship between the oxidation degree P1 (=$P_{H2O}/P_{H2}$) of the atmosphere gas in the heating area for decarburization annealing and the Cr content X:

$$0.18X - 0.008 \leq P1 \leq 0.25X + 0.15 \leq 0.20 \quad \text{(Expression 1)}$$

Also, it can be seen from FIG. 2 that good characteristics with the amount of carbon after decarburization annealing of 0.0030% or less and the iron loss ($W_{17/50}$) of 0.67 (W/kg) or less are obtained within the range of the following Expression 3 according to the relationship between the oxidation degree P1 (=$P_{H2O}/P_{H2}$) of the atmosphere gas in the heating area for decarburization annealing and the Cr content X:

$$0.3X + 0.025 \leq P1 \leq 0.25X + 0.15 \leq 0.20 \quad \text{(Expression 3)}$$

In FIG. 2, the area is indicated by an area surrounded by solid lines.

Example 4

Furthermore, the influence on the characteristics of the cold rolling step was reviewed. The results will be explained below.

A silicon steel slab containing, in terms of mass % obtained through casting, Si: 3.3%; Mn: 0.1%; C: 0.06%; S: 0.007%; acid-soluble Al: 0.028%; N: 0.008%; Cr: 0.11%; and the remainder: Fe and impurities was heated and then subjected to hot rolling to have a sheet thickness of 2.6 mm. Some of the hot rolled sheet was annealed (subjected to hot-band annealing) at 1100° C., was subjected to cold rolling to have a sheet thickness of 2.0 mm, and was heated to 1120° C., and then was subjected to annealing in which a temperature was cooled to 950° C. and held for 30 seconds (intermediate annealing) and then was further subjected to cold rolling to have a final sheet thickness of 0.22 mm (Step A). The other hot rolled sheet was subjected to cold rolling to have a sheet thickness of 2.0 mm without subjected to hot-band annealing, was heated to 1120° C. and was subjected to annealing in which a temperature was cooled to 950° C. and held for 30 seconds (intermediate annealing) was performed, and then was subjected to cold rolling to have a final sheet thickness of 0.22 mm (Step B). Cold rolling ratios after final annealing in all cases were 89%.

The cold rolled sheet was subjected to decarburization annealing in which a temperature was raised to a temperature of 830° C. at a heating rate of 30° C./second and held for 120 seconds, in an atmosphere gas of an oxidation degree ($P_{H2O}/P_{H2}$) of 0.06 containing 75% hydrogen and 25% nitrogen. In Example 4, the oxidation degree in the heating area is equal to the oxidation degree in the soaking area.

After that, an amount of nitrogen in the steel was increased to 0.025 mass % in ammonia gas to strengthen the inhibitor.

The decarburized annealed sheet was subjected to the final annealing in which an annealing separator (90 mass % of alumina+10 mass % of magnesia) containing alumina as a main component was applied in the form of a water slurry, a temperature was raised to 1200° C. in an atmosphere gas containing 75% hydrogen and 25% nitrogen, the atmosphere gas was changed to a 100% hydrogen atmosphere gas, and then annealing was performed at 1200° C. for 20 hours.

The samples prepared through the above steps were washed with water and then were sheared, were subjected to stress relief annealing, had an insulation coating formed to provide tension to the steel sheet (had a tension coating to be applied), were subjected to laser irradiation, and were subjected to magnetic measurement using through an SST method.

Table 3 shows amounts of carbons after the decarburization annealing and the values of iron loss ($W_{17/50}$) obtained through the above magnetic measurement.

TABLE 3

| Step | Amount of carbon of decarburized sheet (ppm) | Evaluation of amount of carbon | Iron loss ($W_{17/50}$) (W/kg) | Evaluation of iron loss | Comprehensive evaluation |
|---|---|---|---|---|---|
| A | 10 | Ex | 0.64 | Ex | Ex |
| B | 8 | Ex | 0.63 | Ex | Ex |

In Table 3, "Ex" means an excellent result.

As shown in Table 3, regardless of which step was passed, in each, the amount of carbon in the steel which has been subjected to decarburization was 0.0030% (30 ppm) or less, and good iron loss was obtained.

Example 5

Furthermore, the influence of components of a silicon steel slab on the characteristics was investigated. The results will be described below as Example 5.

A silicon steel slab containing the components shown in Table 4 obtained by casting and composed of the remainder: Fe and impurities was heated and then subjected to hot rolling to have a sheet thickness of 2.3 mm. The hot rolled sheet was subjected to annealing in which a temperature was raised to 1120° C., lowered to 950° C., and then held for 30 seconds and then was subjected to cold rolling once to have a final sheet thickness of 0.22 mm.

The cold rolled sheet was subjected to decarburization annealing in an atmosphere gas containing 75% hydrogen and 25% nitrogen in which a temperature was raised to 830° C. at a heating rate of 30° C./second at an oxidation degree ($P_{H2O}/P_{H2}$) of 0.10 and the oxidation degree ($P_{H2O}/P_{H2}$) was changed to an oxidation degree ($P_{H2O}/P_{H2}$) of 0.06 and held for 120 seconds.

After that, the amount of nitrogen in the steel was increased to 0.025 mass % in ammonia gas to strengthen the inhibitor.

The decarburized annealed sheet was subjected to the final annealing in which an annealing separator (60 mass % of alumina 10 mass % of magnesia) containing alumina as a main component was applied in the form of a water slurry, a temperature was raised to 1200° C. in an atmosphere gas containing 75% hydrogen and 25% nitrogen, the atmosphere gas was changed to a 100% hydrogen atmosphere gas, and then annealing was performed at 1200° C. for 20 hours.

The samples prepared through the above steps were washed with water and then were sheared, were subjected to stress relief annealing, had an insulation coating formed to provide tension to the steel sheet (had a tension coating to be applied), were subjected to laser irradiation, and were subjected to magnetic measurement using through an SST method.

Table 4 shows amounts of carbon after the decarburization annealing and the values of iron loss ($W_{17/50}$) obtained through the above magnetic measurement.

TABLE 4

| | Unit: mass %: remainder Fe and impurities | | | | | | | | | | | |
|---|---|---|---|---|---|---|---|---|---|---|---|---|
| Sample No. | Si | Mn | C | S | Acid-soluble Al | N | Cr | Cu | P | Ni | B | V |
| 1 | 3.20 | 0.10 | 0.05 | 0.006 | 0.027 | 0.008 | 0.12 | | | | | |
| 2 | 2.70 | 0.12 | 0.05 | 0.005 | 0.028 | 0.008 | 0.10 | | | | | |
| 3 | 3.80 | 0.12 | 0.06 | 0.005 | 0.028 | 0.008 | 0.10 | | | | | |
| 4 | 3.20 | 0.14 | 0.05 | 0.007 | 0.027 | 0.007 | 0.12 | | | | | |
| 5 | 3.20 | 0.45 | 0.05 | 0.007 | 0.027 | 0.007 | 0.12 | | | | | |
| 6 | 3.30 | 0.11 | 0.04 | 0.006 | 0.026 | 0.008 | 0.09 | | | | | |
| 7 | 3.20 | 0.11 | 0.07 | 0.006 | 0.026 | 0.008 | 0.09 | | | | | |
| 8 | 3.30 | 0.13 | 0.06 | 0.004 | 0.027 | 0.007 | 0.12 | | | | | |
| 9 | 3.20 | 0.13 | 0.05 | 0.015 | 0.027 | 0.007 | 0.12 | | | | | |
| 10 | 3.30 | 0.10 | 0.06 | 0.005 | 0.025 | 0.008 | 0.13 | | | | | |
| 11 | 3.30 | 0.10 | 0.06 | 0.005 | 0.035 | 0.008 | 0.13 | | | | | |
| 12 | 3.20 | 0.11 | 0.05 | 0.006 | 0.027 | 0.004 | 0.12 | | | | | |
| 13 | 3.20 | 0.11 | 0.05 | 0.006 | 0.027 | 0.010 | 0.12 | | | | | |
| 14 | 3.30 | 0.12 | 0.06 | 0.005 | 0.029 | 0.008 | 0.10 | 0.2 | | | | |
| 15 | 3.20 | 0.11 | 0.05 | 0.006 | 0.027 | 0.008 | 0.11 | | 0.2 | | | |
| 16 | 3.20 | 0.14 | 0.06 | 0.006 | 0.026 | 0.008 | 0.12 | | | 0.3 | | |
| 17 | 3.30 | 0.11 | 0.05 | 0.005 | 0.027 | 0.008 | 0.11 | | | | 0.003 | |
| 18 | 3.20 | 0.10 | 0.05 | 0.006 | 0.025 | 0.009 | 0.12 | | | | | 0.07 |
| 19 | 3.30 | 0.11 | 0.06 | 0.006 | 0.026 | 0.009 | 0.13 | | | | | |
| 20 | 3.30 | 0.11 | 0.05 | 0.006 | 0.027 | 0.008 | 0.11 | | | | | |
| 21 | 3.20 | 0.14 | 0.06 | 0.008 | 0.027 | 0.007 | 0.12 | | | | | |
| 22 | 3.20 | 0.10 | 0.05 | 0.006 | 0.028 | 0.008 | 0.12 | | | | | |

| Sample No. | Nb | Me | Ti | Bi | Amount of carbon of decarburized sheet (ppm) | Evaluation of amount of carbon | Iron loss ($W_{17/150}$) (W/kg) | Evaluation of iron loss | Comprehensive evaluation |
|---|---|---|---|---|---|---|---|---|---|
| 1 | | | | | 9 | Ex | 0.65 | Ex | Ex |
| 2 | | | | | 7 | Ex | 0.68 | Ex | Ex |
| 3 | | | | | 19 | Ex | 0.62 | Ex | Ex |
| 4 | | | | | 9 | Ex | 0.65 | Ex | Ex |
| 5 | | | | | 8 | Ex | 0.66 | Ex | Ex |
| 6 | | | | | 9 | Ex | 0.67 | Ex | Ex |
| 7 | | | | | 19 | Ex | 0.68 | Ex | Ex |
| 8 | | | | | 10 | Ex | 0.67 | Ex | Ex |
| 9 | | | | | 9 | Ex | 0.69 | Ex | Ex |
| 10 | | | | | 9 | Ex | 0.66 | Ex | Ex |
| 11 | | | | | 9 | Ex | 0.63 | Ex | Ex |
| 12 | | | | | 9 | Ex | 0.68 | Ex | Ex |
| 13 | | | | | 10 | Ex | 0.64 | Ex | Ex |
| 14 | | | | | 9 | Ex | 0.63 | Ex | Ex |
| 15 | | | | | 10 | Ex | 0.64 | Ex | Ex |
| 16 | | | | | 11 | Ex | 0.65 | Ex | Ex |
| 17 | | | | | 10 | Ex | 0.63 | Ex | Ex |
| 18 | | | | | 11 | Ex | 0.64 | Ex | Ex |
| 19 | 0.05 | | | | 13 | Ex | 0.64 | Ex | Ex |
| 20 | | 0.05 | | | 9 | Ex | 0.65 | Ex | Ex |
| 21 | | | 0.005 | | 9 | Ex | 0.66 | Ex | Ex |
| 22 | | | | 0.005 | 10 | Ex | 0.63 | Ex | Ex |

As shown in Table 4, regardless of the composition of the silicon steel slab to be used, in each, the amount of carbon in the steel which has been subjected to decarburization was 0.0030% (30 ppm) or less, good iron loss was obtained.

It can be seen from the above results that, in the decarburization annealing step of performing decarburization annealing in a moist hydrogen atmosphere to remove carbon contained in the steel which has been subjected to cold rolling, a decarburization reaction is stably performed, and thereby a product with good iron loss characteristics can be manufactured by promoting smoothing of the surface of the steel sheet by containing an appropriate amount of Cr and controlling the oxidation degree P1 of the atmosphere gas in the heating area and the oxidation degree P2 of the atmosphere gas in the soaking area in the decarburization annealing step to an oxidation degree in which iron-based oxides are not formed.

The invention claimed is:

1. A method for manufacturing a grain-oriented electrical steel sheet, comprising:
   a silicon steel material production process of producing a silicon steel material;
   a hot rolling process of obtaining a hot rolled sheet by subjecting the silicon steel material to hot rolling;
   a cold rolling process of obtaining a steel sheet having a final sheet thickness by subjecting the hot rolled sheet to a single cold rolling process or to multiple cold rolling processes having intermediate annealing performed between cold rolling processes;
   a decarburization annealing process of subjecting the steel sheet to decarburization annealing using a decarburization annealing furnace including a heating area and a soaking area; and
   a final annealing process of applying an annealing separator having alumina as a main component to the steel sheet and subjecting the steel sheet to final annealing,
   wherein the silicon steel material contains, in terms of mass %,
   Si: 0.8 to 7.0%;
   C: 0.085% or less;
   acid-soluble Al: 0.010 to 0.065%;
   N: 0.004 to 0.012%;
   Mn: 1.00% or less;
   S: 0.050% or less;
   Cr: 0.02 to 0.50%; and
   the remainder: Fe and impurities, and
   in the decarburization annealing process, when the Cr content of the silicon steel material in terms of mass % is specified X, an oxidation degree P1 of an atmosphere gas in the heating area satisfies the following Expression 1 and an oxidation degree P2 of an atmosphere gas in the soaking area satisfies the following Expression 2, and
   the P1 and the P2 satisfy the following Expression 4:

$$0.18X - 0.008 \leq P1 \leq 0.25X + 0.15 \leq 0.20 \quad \text{(Expression 1);}$$

$$0.01 \leq P2 \leq 0.15 \quad \text{(Expression 2); and}$$

$$P1 > P2 \quad \text{(Expression 4).}$$

2. The method for manufacturing a grain-oriented electrical steel sheet according to claim 1, wherein the P1 satisfies the following Expression 3:

$$0.3X + 0.025 \leq P1 \leq 0.25X + 0.15 \leq 0.20 \quad \text{(Expression 3).}$$

3. The method for manufacturing a grain-oriented electrical steel sheet according to claim 1, wherein the silicon steel material further contains, in terms of mass %,
   Cu: 0% or more and 0.4% or less;
   P: 0% or more and 0.5% or less;
   Ni: 0% or more and 1.0% or less;
   B: 0% or more and 0.008% or less;
   V: 0% or more and 0.15% or less;
   Nb: 0% or more and 0.20% or less;
   Mo: 0% or more and 0.10% or less;
   Ti: 0% or more and 0.015% or less; and
   Bi: 0% or more and 0.010% or less.

4. The method for manufacturing a grain-oriented electrical steel sheet according to claim 1, further comprising:
   a nitriding treatment process being performed from before the decarburization annealing process to before secondary recrystallization initiation in the final annealing process.

5. The method for manufacturing a grain-oriented electrical steel sheet according to claim 1, further comprising:
   a hot-band annealing process of subjecting the hot rolled sheet obtained in the hot rolling process to annealing after the hot rolling process and before the cold rolling process.

6. The method for manufacturing a grain-oriented electrical steel sheet according to claim 2, wherein the silicon steel material further contains, in terms of mass %,
   Cu: 0% or more and 0.4% or less;
   P: 0% or more and 0.5% or less;
   Ni: 0% or more and 1.0% or less;
   B: 0% or more and 0.008% or less;
   V: 0% or more and 0.15% or less;
   Nb: 0% or more and 0.20% or less;
   Mo: 0% or more and 0.10% or less;
   Ti: 0% or more and 0.015% or less; and
   Bi: 0% or more and 0.010% or less.

7. The method for manufacturing a grain-oriented electrical steel sheet according to claim 2, further comprising:
   a nitriding treatment process being performed from before the decarburization annealing process to before secondary recrystallization initiation in the final annealing process.

8. The method for manufacturing a grain-oriented electrical steel sheet according to claim 3, further comprising:
   a nitriding treatment process being performed from before the decarburization annealing process to before secondary recrystallization initiation in the final annealing process.

9. The method for manufacturing a grain-oriented electrical steel sheet according to claim 2, further comprising:
   a hot-band annealing process of subjecting the hot rolled sheet obtained in the hot rolling process to annealing after the hot rolling process and before the cold rolling process.

10. The method for manufacturing a grain-oriented electrical steel sheet according to claim 3, further comprising:
    a hot-band annealing process of subjecting the hot rolled sheet obtained in the hot rolling process to annealing after the hot rolling process and before the cold rolling process.

11. The method for manufacturing a grain-oriented electrical steel sheet according to claim 4, further comprising:
    a hot-band annealing process of subjecting the hot rolled sheet obtained in the hot rolling process to annealing after the hot rolling process and before the cold rolling process.

* * * * *